(12) United States Patent
Suzuki

(10) Patent No.: US 8,755,129 B2
(45) Date of Patent: Jun. 17, 2014

(54) LENS BARREL

(71) Applicant: Canon Kabushiki Kaisha, Tokyo (JP)

(72) Inventor: Nobuyoshi Suzuki, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/731,188

(22) Filed: Dec. 31, 2012

(65) Prior Publication Data

US 2013/0120857 A1 May 16, 2013

Related U.S. Application Data

(63) Continuation of application No. 13/211,723, filed on Aug. 17, 2011, now Pat. No. 8,369,025.

(30) Foreign Application Priority Data

Aug. 18, 2010 (JP) .................................. 2010-183293
Aug. 4, 2011 (JP) .................................. 2011-171031

(51) Int. Cl.
G02B 15/14 (2006.01)

(52) U.S. Cl.
USPC ............................ 359/700; 359/699; 359/701

(58) Field of Classification Search
USPC .................................. 359/694–704, 811–830
See application file for complete search history.

(56) References Cited

U.S. PATENT DOCUMENTS

| 6,961,189 B2 * | 11/2005 | Nishimura | 359/699 |
| 7,929,228 B2 * | 4/2011 | Oikawa | 359/819 |
| 8,369,025 B2 * | 2/2013 | Suzuki | 359/700 |
| 2004/0190160 A1 | 9/2004 | Nishimura | |
| 2007/0195429 A1 | 8/2007 | Kobayashi | |

FOREIGN PATENT DOCUMENTS

| CN | 101271184 A | 9/2008 |
| JP | 2010048967 A | 3/2010 |

OTHER PUBLICATIONS

Chinese Office Action issued in Chinese counterpart application No. CN201110237804.X, dated Jun. 20, 2013. English translation provided.

* cited by examiner

*Primary Examiner* — Mohammed Hasan

(74) *Attorney, Agent, or Firm* — Rossi, Kimms & McDowell LLP

(57) ABSTRACT

A lens barrel capable of distributing, upon receipt of the impact of, e.g., dropping, a torque load so as not to concentrate on a particular linear movement key and groove for linearly moving a barrel member, thereby suppressing occurrence of a failure. The lens barrel has a fixed barrel (8) and a third lens group barrel (3). In a movement region of the third lens group barrel (3) moving in the optical direction relative to the fixed barrel (8), each of a set of a first linear movement groove (8*c*) and a first linear movement key (3*c*) and a set of a second linear movement groove (8*d*) and a second linear movement key (3*d*) has a mutually engageable region and a mutually disengageable region, and a set of a groove (8*e*) and a projection (3*e*) has not a mutually engageable region.

5 Claims, 6 Drawing Sheets

LENS BARREL

CROSS-REFERENCE TO RELATED APPLICATIONS

The subject matter of application Ser. No. 13/211,723 is incorporated herein by reference. The present application is a Continuation of U.S. Ser. No. 13/211,723, filed Aug. 17, 2011, now U.S. Pat. No. 8,369,025 B2, issued Feb. 5, 2013. This application also claims priority from Japanese Patent Application No. 2011-171031 filed Aug. 4, 2011 and Japanese Patent Application No. 2010-183293 filed Aug. 18, 2010, which are incorporated by reference herein in their entirety.

BACKGROUND OF THE INVENTION

1. Field of the Invention

The present invention relates to a lens barrel mounted on an image pickup apparatus such as a camera, and more particularly relates to a lens barrel including a barrel member that linearly advances/retracts in the direction of an optical axis of the image pickup apparatus.

2. Description of the Related Art

Some lens barrels for image pickup apparatuses may include a zooming mechanism, and the zooming mechanism includes a linear movement mechanism configured to move the lens barrel in an optical axis direction of the image pickup apparatus from a retracted position at which the lens barrel is housed in a body of the image pickup apparatus to a shooting position without turning the lens barrel.

Conventionally, the linear movement mechanism employed in the lens barrel may include a type of guiding a linear movement barrel with respect to a fixed barrel linearly in the optical axis direction by means of interaction between a linear movement key formed on the linear movement barrel and a linear movement groove formed on the fixed barrel. In such a linear movement mechanism, if the linear movement groove is formed on the fixed barrel over the entire region from the retracted region to the shooting region, the linear movement groove crosses a cam groove and/or a through groove formed on the fixed barrel, thereby unfavorably disabling the linear movement barrel to be guided linearly.

Therefore, in such a linear movement mechanism, the fixed barrel has a first and a second linear movement groove formed in the shooting region and the retracted region, respectively, and also the linear movement barrel has a first and a second linear movement key formed in the retracted region and the shooting region; accordingly, changing the engagement of the linear movement key to the linear movement groove allows the linear movement barrel to be guided linearly in the optical axis direction. Furthermore, according to the linear movement mechanism, the first linear movement key formed on the linear movement barrel engages with the first linear movement groove formed on the fixed barrel in the shooting region while disengaging with the first linear movement groove with a little backlash in the retracted region, whereas the second linear movement key formed on the linear movement barrel engages with the second linear movement groove formed on the fixed barrel in the retracted region while disengaging with the second linear movement groove with a little backlash in the shooting region (see Japanese Laid-Open Patent Publication (Kokai) No. 2010-048967, for example).

However, in the aforementioned structure of the linear movement mechanism, the cam groove and/or the through groove formed on the fixed barrel restricts the shape of the linear movement key, thereby making it difficult to ensure the rigidity of the linear movement key.

Furthermore, if the linear movement barrel receives a torque upon receipt of the impact of, e.g., dropping, the torque generated by the impact is imposed on the first linear movement key and the first linear movement groove engaging with each other. Furthermore, if the torque generated by the impact is so large as to deform the fixed barrel, the second linear movement key and the second linear movement groove disengaging with each other, also receive the torque.

If the second linear movement key is located on a part of the second linear movement groove crossing the cam groove and/or the through groove, the linear movement barrel receiving a larger torque due to the impact allows only the first linear movement key and the first linear movement groove to receive the torque, thereby resulting in the turning force concentrating on the first linear movement key, which may cause a failure if the linear movement key cannot be provided with ensured rigidity.

SUMMARY OF THE INVENTION

The present invention provides a lens barrel capable of distributing, upon receipt of the impact of, e.g., dropping, a torque load so as not to concentrate on a particular linear movement key and groove for linearly moving a barrel member, thereby suppressing occurrence of a failure.

In an aspect of the present invention, there is proposed a lens barrel comprising a linear guiding member (8) having a first linear movement groove (8c), a second linear movement groove (8d) and a groove (8e), each of which extending in an optical axis direction of the lens barrel; a cam barrel (6) having a cam groove (6c), the cam barrel (6) moving in the optical direction while rotating; and a linear movement unit (3) having a lens therein, the linear movement unit (3) being movable in the optical direction relative to the linear guiding member (8), and having a cam pin (3a) engaging with the cam groove (6c), a first linear movement key (3c) engaging with the first linear movement groove (8c), a second linear movement key (3d) engaging with the second linear movement groove (8d), and a projection (3e) engaging with the groove (8e), wherein in a movement region of the linear movement unit (3) moving in the optical direction relative to the linear guiding member (8), each of a set of the first linear movement groove (8c) and the first linear movement key (3c) and a set of the second linear movement groove (8d) and the second linear movement key (3d) has a mutually engageable region and a mutually disengageable region, and a set of the groove (8e) and the projection (3e) has not a mutually engageable region.

According to the present invention, it is possible to distribute, upon receipt of the impact of, e.g., dropping, a torque so as not to concentrate on a particular linear movement key and groove for linearly moving the barrel member, thereby suppressing occurrence of a failure.

Further features and advantages of the present invention will become apparent from the following detailed description of exemplary embodiments with reference to the attached drawings.

DETAILED DESCRIPTION OF THE EMBODIMENTS

The present invention will now be described in detail with reference to the drawings.

Figure 1:
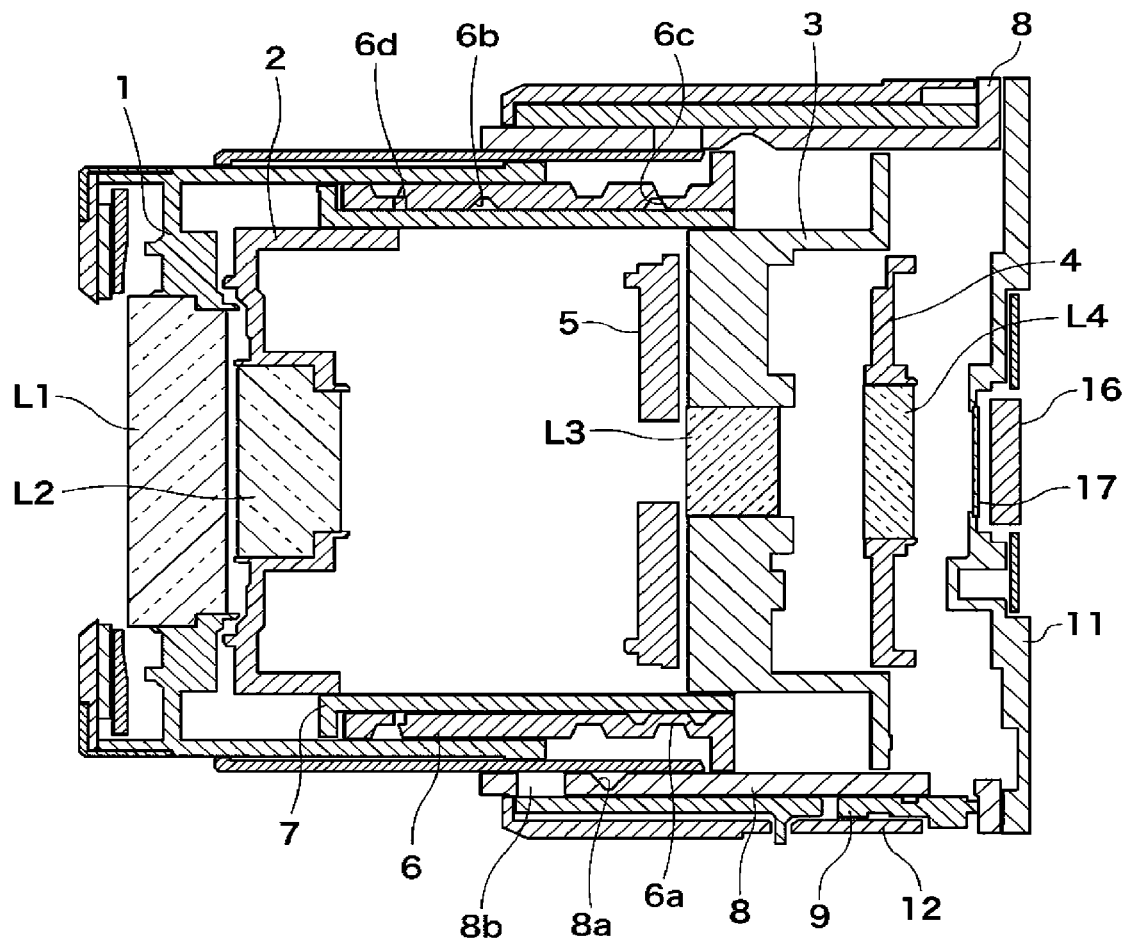
FIG. 1 is a vertical cross-sectional view of a lens barrel according to an embodiment of the present invention, which shows a case where the lens barrel is in a shooting state.
Figure 2:
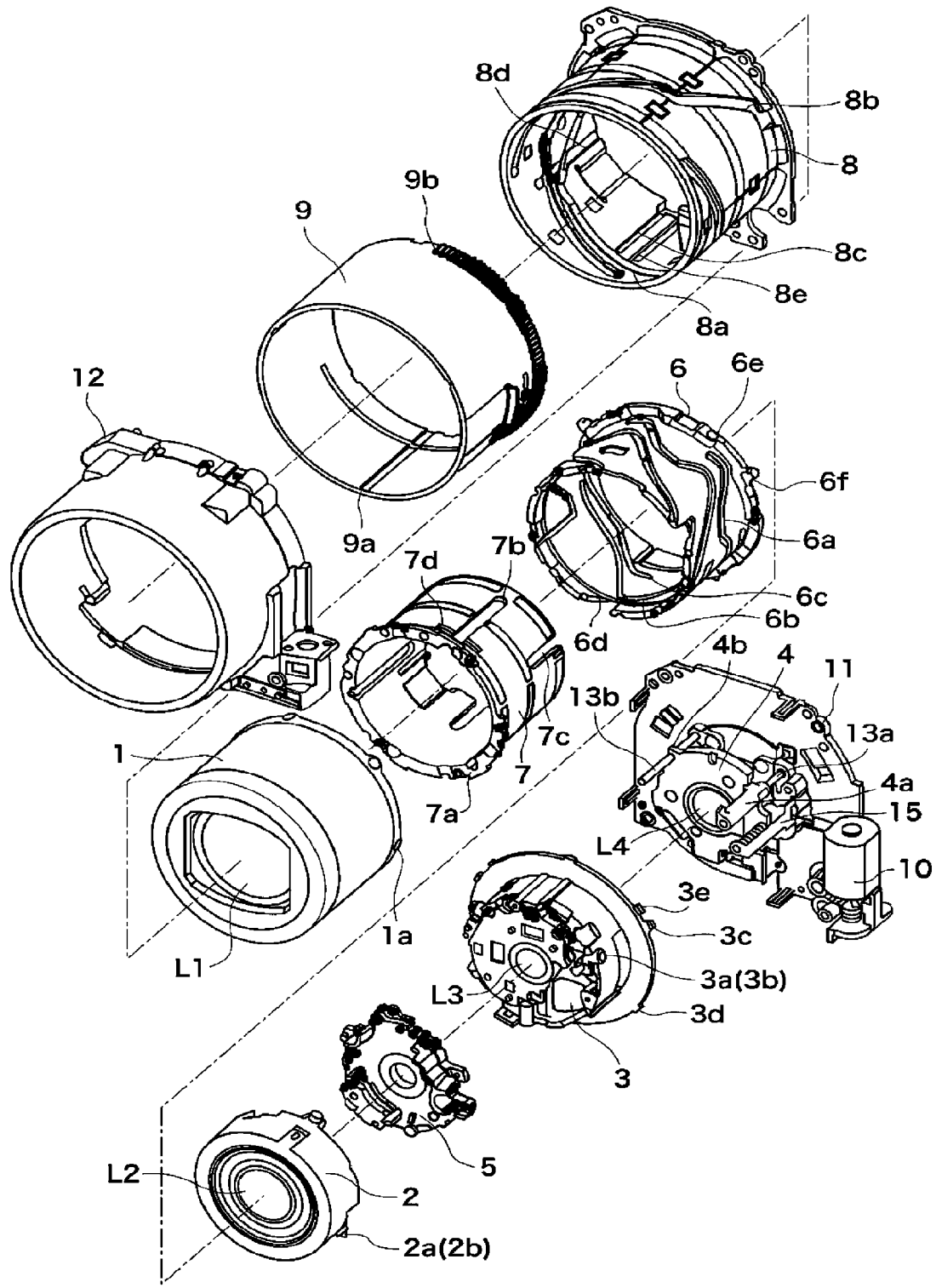
FIG. 2 is an exploded perspective view of the lens barrel of FIG. 1.

FIG. 1 is a vertical cross-sectional view of a lens barrel according to an embodiment of the present invention, which shows a case where the lens barrel is in a shooting state. FIG. 2 is an exploded perspective view of the lens barrel of FIG. 1.

A main part of a lens barrel according to an embodiment of the present invention will be described with reference to FIGS. 1 and 2.

In FIG. 1, a lens barrel according to an embodiment of the present invention includes a four-lens group optical system including a first lens group L1, a second lens group L2, a third lens group L3 and a fourth lens group L4.

The first lens group L1 is held by a first lens group barrel 1 which has six cam pins 1a at an inner peripheral surface thereof. The cam pins 1a are respectively engaged with cam grooves 6a formed at an outer peripheral surface of a cam barrel 6. Furthermore, the first lens group barrel 1 has linear movement grooves (not shown) at three positions on the inner peripheral surface thereof. The linear movement grooves are respectively engaged with linear movement keys 7a formed at an outer peripheral surface of a linear movement barrel 7.

The second lens group L2 is held by a second lens group barrel 2. The second lens group barrel 2 has three cam pins 2a at an outer peripheral surface thereof. The cam pins 2a are respectively engaged with cam grooves 6b formed at an inner peripheral surface of the cam barrel 6. Furthermore, the second lens group barrel 2 has linear movement keys 2b respectively formed at positions corresponding to those of the cam pins 2a. The linear movement keys 2b are respectively engaged with linear movement grooves 7b formed on the linear movement barrel 7.

Figure 4:
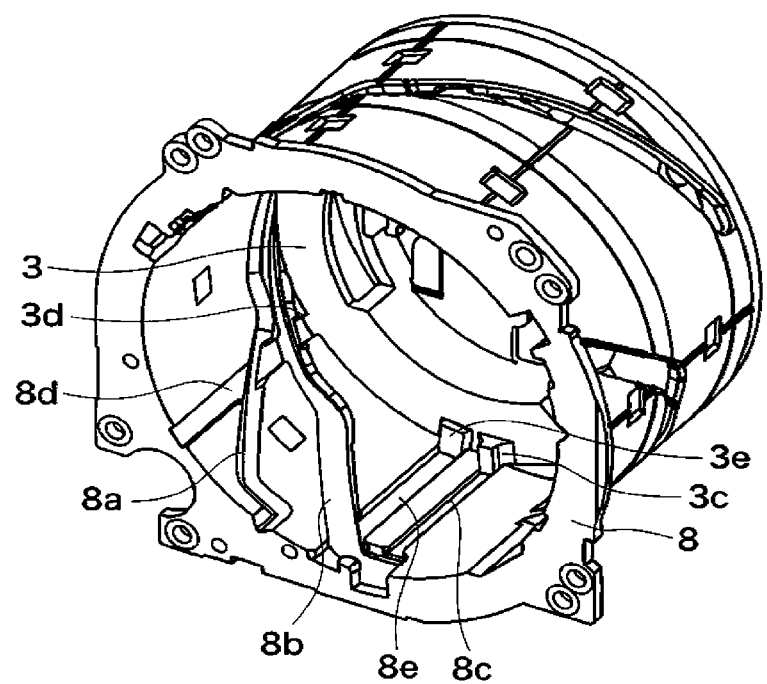
FIG. 4 is a perspective view of an assembly of the third lens group barrel and a fixed barrel in the lens barrel of FIG. 1.

The third lens group L3 is held by a third lens group barrel 3 (linear movement unit). The third lens group L3 only needs to be included in the third lens group barrel 3, and hence may be held by another member included in the third lens group barrel 3 without being held directly by the third lens group barrel 3. The third lens group barrel 3 has three cam pins 3a at an outer peripheral surface thereof. The three cam pins 3a are engaged with cam grooves 6c formed at the inner peripheral surface of the cam barrel 6, respectively. Further, the third lens group barrel 3 has linear movement keys 3b respectively formed at positions corresponding to those of the cam pins 3a. The linear movement keys 3b are respectively engaged with linear movement grooves 7c formed on the linear movement barrel 7. Furthermore, as shown in FIG. 4, the third lens group barrel 3 has three linear movement keys 3c, three linear movement keys 3d and three projections 3e at a rear end of the outer peripheral surface thereof.

The linear movement keys 3c and 3d respectively engage with three linear movement grooves 8c and three linear movement grooves 8d formed on an inner peripheral surface of a fixed barrel 8.

The projections 3e respectively face three grooves 8e formed on the inner peripheral surface of the fixed barrel 8 with a little backlash.

The fixed barrel 8 has three sets of the linear movement groove 8c, the linear movement groove 8d, and the groove 8e.

Similarly, the third lens group barrel 3 has three sets of a linear movement key 3c, a linear movement key 3d, and a projection 3e at the rear end of the outer peripheral surface thereof. Respective sets of the linear movement key 3c and the linear movement groove 8c are arranged at equiangular distances (120°). The same is true of respective sets of the linear movement key 3d and the linear movement groove 8d and respective sets of the projection 3e and the groove 8e, respectively. The linear movement key 3c and the linear movement key 3d adjacent to each other are arranged at an angle of 60°.

In the present specification, "a set of linear movement grooves 8c" means "one or more linear movement grooves 8c". The same is true of "a set of linear movement groove 8d" and "a set of grooves 8e", respectively.

Also, in the present specification, "a set of linear movement keys 3c" means "one or more linear movement keys 3c". The same is true of "a set of linear movement keys 3d" and "a set of projections 3e", respectively.

Furthermore, a diaphragm shutter device 5 is fastened to the third lens group barrel 3 via screws (not shown).

The cam barrel 6 has grooves 6d formed on the inner peripheral surface thereof, and the grooves 6d are respectively engaged with three projections 7d formed on the outer peripheral surface of the linear movement barrel 7, thereby causing the cam barrel 6 to be rotatably supported by the linear movement barrel 7 to move integrally with the linear movement barrel 7. Three cam pins 6e disposed on the outer peripheral surface of the cam barrel 6 are engaged with cam grooves 8a formed on the inner peripheral surface of the fixed barrel 8. Three drive pins 6f disposed on the outer peripheral surface of the cam barrel 6 are engaged with linear movement grooves 9a formed on an inner peripheral surface of a drive barrel 9 while passing through grooves 8b disposed on the fixed barrel 8.

The linear movement barrel 7 supports the first lens group barrel 1 and the second lens group barrel 2 in an unrotatable manner. Furthermore, the third lens group barrel 3 supports the linear movement barrel 7 in such a manner that the linear movement barrel 7 cannot turn.

A gear 9b formed on an outer peripheral surface of the drive barrel 9 is coupled to a drive device 10 comprising a DC motor and a plurality of gear parts. The drive device 10 rotates the drive barrel 9, thereby allowing the drive pins 6f to be guided along the linear movement grooves 9a of the drive barrel 9 and allowing the cam pins 6e to be guided along the cam grooves 8a of the fixed barrel 8, which causes the cam barrel 6 to move in the optical axis direction without rotation.

The cam pins 1a are guided along the cam grooves 6a of the cam barrel 6 and the linear movement keys 7a of the linear movement barrel 7 are guided along the linear movement grooves 1b, which causes the first lens group barrel 1 to move in the optical axis direction without rotation.

The cam pins 2a are guided along the cam grooves 6b of the cam barrel 6 and the linear movement keys 2b are guided along the linear movement grooves 7b of the linear movement barrel 7, which causes the second lens group barrel 2 to move in the optical axis direction without rotation.

The cam pins 3a are guided along the cam grooves 6c of the cam barrel 6 and the linear movement keys 3c and 3d are guided by the linear movement grooves 8c and 8d of the fixed barrel 8, respectively, which causes the third lens group barrel 3 to move in the optical axis direction without rotation.

The fixed barrel 8 has a crossing part at which the cam grooves 8a and the through grooves 8b formed at the inner peripheral surface of the fixed barrel 8 cross the linear movement grooves 8d. Thus, the linear movement keys 3c and 3d of the third lens group barrel 3 linearly move in the optical direction in such a manner that the key and groove engagement is switched between the linear movement keys 3c and 3d and the respective linear movement grooves 8c and 8d at the respective crossing parts in which the grooves cross each other.

The linear movement keys 3c of the third lens group barrel 3 engage with the linear movement grooves 8c of the fixed barrel 8 in the shooting region 8Z1, but does not engage with the linear movement grooves 8c with a little backlash in the retracted region 8S1. Furthermore, the linear movement keys 3d of the third lens group barrel 3 engage with the linear movement grooves 8d of the fixed barrel 8 in the retracted region 8S2, but do not engage with the linear movement grooves 8d with a little backlash in the shooting region 8Z2.

The linear movement keys 3c and 3d of the third lens group barrel 3 are respectively formed at an equiangular distance (120°), which enables the third lens group barrel 3 to be stably moved linearly and enables the cam grooves 8a and the through grooves 8b of the fixed barrel 8 to be also formed at an equiangular distance (120°), respectively.

Furthermore, the linear movement keys 3c and 3d are formed at an angle of 60°, respectively, and the linear movement grooves 8c and 8d of the fixed barrel 8 are also formed at an angle of 60°, respectively, which enables desired linear movement grooves 8c and 8d to be formed using six inner slide pieces (inner slide pieces D8 in FIG. 6A) without undercuts.

The fourth lens group L4 is held by a fourth lens group holding frame 4 having a positioning portion 4a and a steady rest portion 4b, which engage with guide bars 13a and 13b disposed on an image sensor base board 11 to be guided movably in the optical direction.

Furthermore, the fourth lens group holding frame 4 includes a nut (not shown) threadably connected to a feed screw shaft disposed on an output shaft of an STM motor 15. When driving the STM motor 15 to rotate the feed screw shaft, the nut threadably connected to the feed screw shaft is subject to a feed operation, thereby causing the positioning portion 4a and the steady portion 4b to be guided along the guide bars 13a and 13b, which allows the fourth lens group holding frame 4 to linearly move in the optical direction without rotation.

In this lens barrel, an image sensor 16 and an optical filter 17 are held on the image sensor base board 11 fastened to the fixed barrel 8 and a cover barrel 12 via screws.

A description will now be given the behavior of the lens barrel constructed as mentioned above when the lens barrel receives the impact of, e.g., dropping, with reference to FIGS. 3A to 6B.

Here, three cases where the cam pin 1a of the first lens group barrel 1 is located at three representative positions in the shooting region of the cam groove 6a will be respectively described.

Figure 5A:
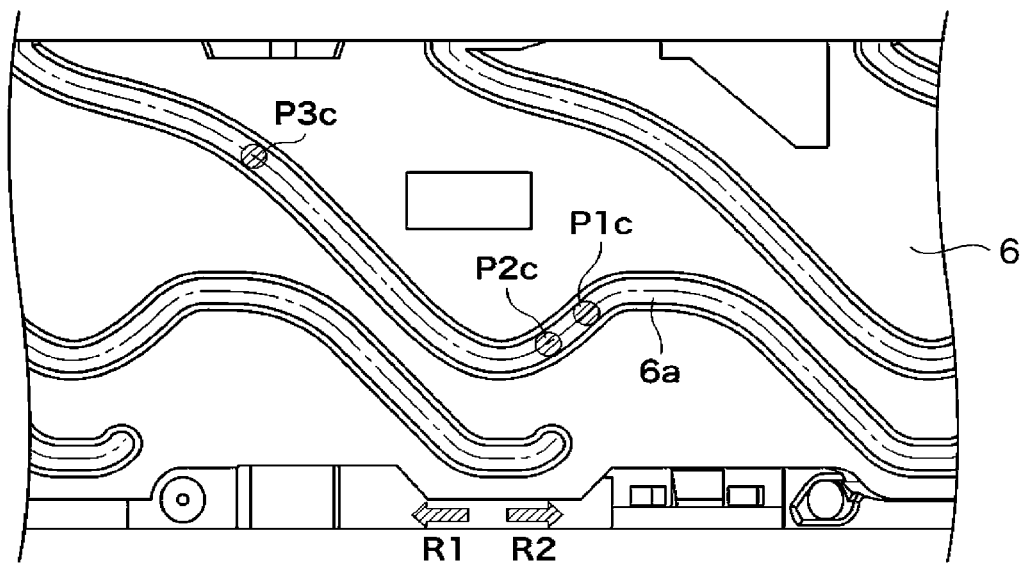
FIG. 5A is a development view of the cam barrel in the lens barrel of FIG. 1.

(Case 1) Where the cam pin 1a of the first lens group barrel 1 is located at a position P1c in the cam groove 6a of the cam barrel 6 in the shooting region (FIG. 5A).

In this case 1, when the first lens group barrel 1 receives an external force F in the optical axis direction when the lens barrel receives the impact of, e.g., dropping (FIG. 3A), the cam barrel 6 receives a reactive force F. Here, at the position P1c where the cam groove sharply inclines, the reactive force F is divided into a reactive force Fc in a direction tangent to the cam groove (FIG. 3B), which allows the cam barrel 6 to receive a rotation moment M1 by a component force Fh of the reactive force Fc to rotate in an R1 direction (counterclockwise in the front view of the lens barrel).

Simultaneously, the first lens group barrel 1 cam-engaged with the cam barrel 6 receives a rotation moment M2 as a reactive force of the rotation moment M1 to rotate in an R2 direction (clockwise in the front view of the lens barrel). Arrows R1 and R2 shown in FIG. 5A indicate rotation directions of the first lens group barrel 1, whereas arrows R1 and R2 shown in FIG. 5B indicate rotation directions of the third lens group barrel 3.

When the first lens group barrel 1 rotates as described above, both of the linear movement barrel 7 linearly engaging with the first lens group barrel 1, and the third lens group barrel 3 linearly engaging with the linear movement barrel 7 rotate in the rotation direction R2, which lastly allows the linear movement groove 8c of the fixed barrel 8 engaged with the linear movement key 3c of the third lens group barrel 3 to receive a torque due to the rotation moment M2.

Figure 5B:
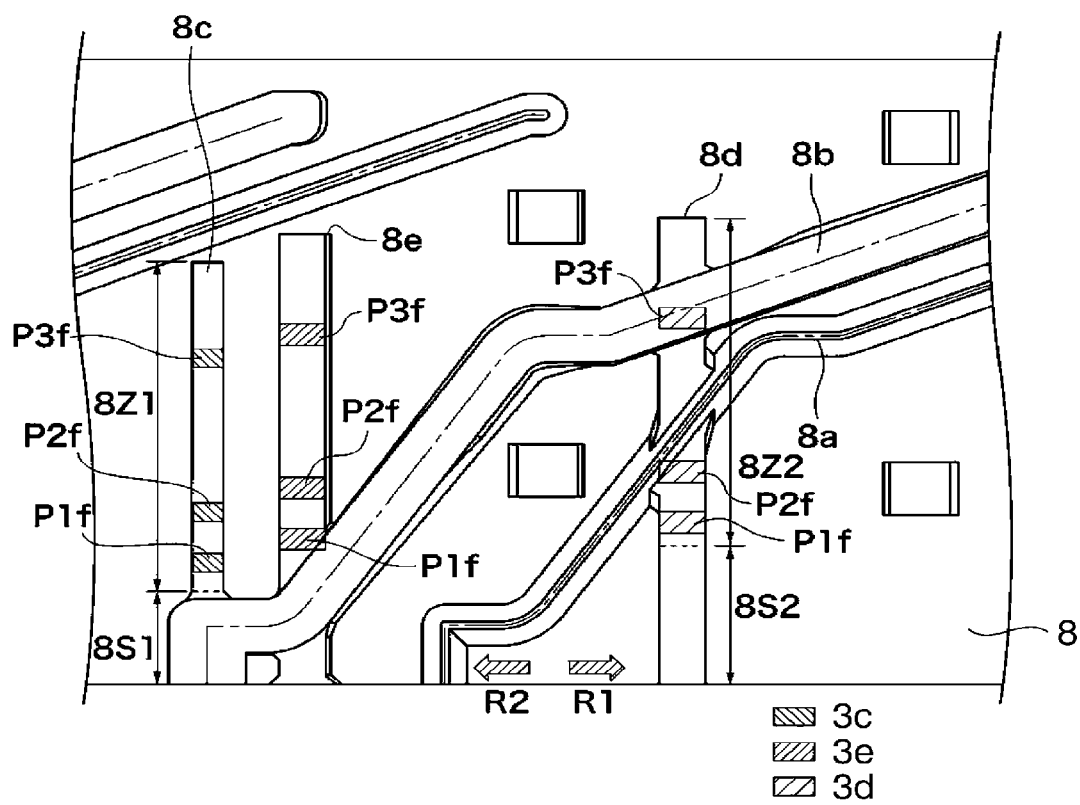
FIG. 5B is a development view of the fixed barrel in the lens barrel of FIG. 1.

In this case 1, the linear movement keys 3c and 3d and the projection 3e of the third lens group barrel 3 are located at positions P1f in the linear movement grooves 8c, 8d and the groove 8e, respectively (FIG. 5B). In a case where the lens barrel receiving a large impact causes the fixed barrel 8 to be unfavorably deformed by a torque received by the linear movement key 3c and the linear movement groove 8c, the linear movement key 3d and the linear movement groove 8d, which are not engaged with each other, also receive the torque due to the impact.

Furthermore, the third lens group barrel 3 has three projections 3e at the outer peripheral surface thereof, which face the grooves 8e formed on the inner peripheral surface of the fixed barrel 8 with a little backlash. Thus, upon receipt of the above-mentioned large impact, the projections 3e and the grooves 8e also receive the torque.

(Case 2) Where the cam pin 1a of the first lens group barrel 1 is located at a position P2c in the cam groove 6a of the cam barrel 6 in the shooting region (FIG. 5A).

Figure 3A:
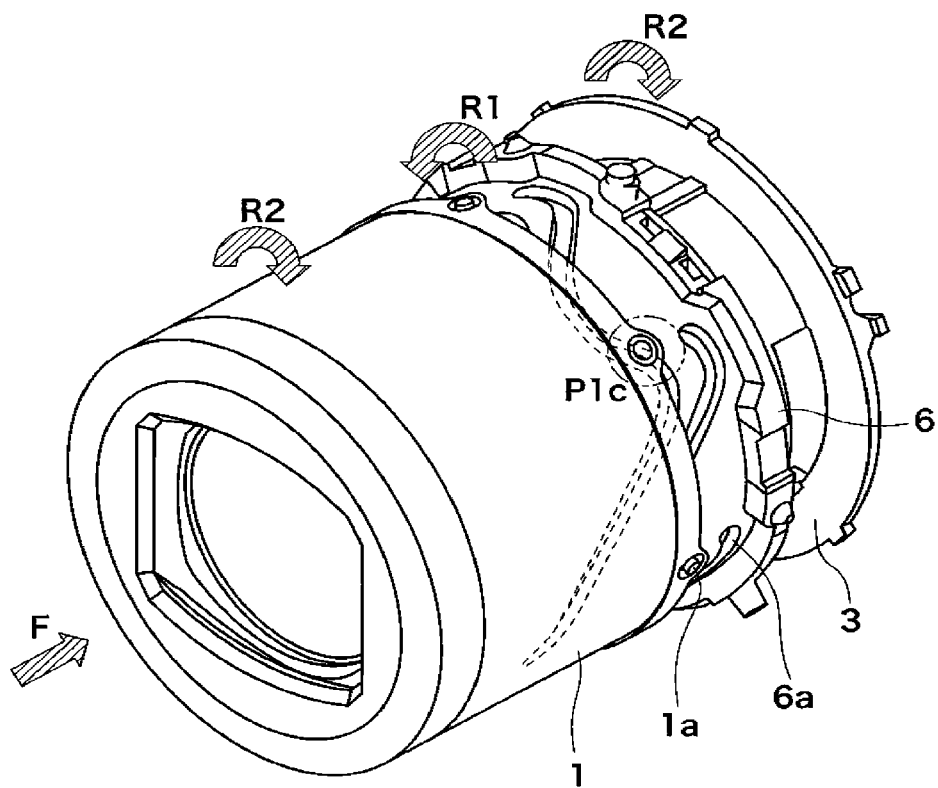
FIG. 3A is a perspective view of an assembly of a first lens group barrel, a third lens group barrel and a cam barrel in the lens barrel of FIG. 1.
Figure 3B:
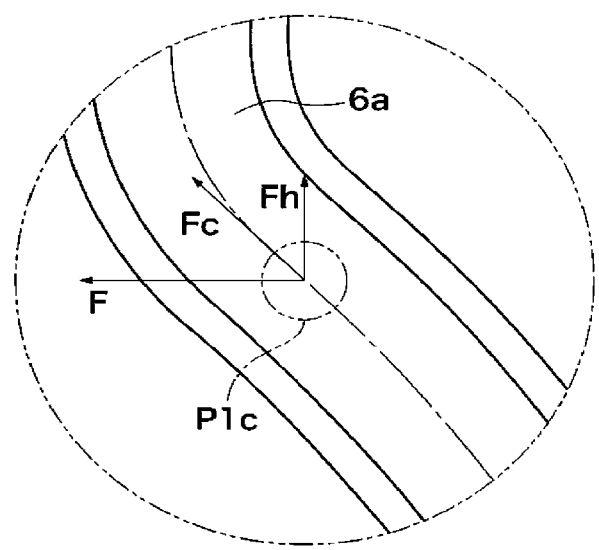
FIG. 3B is an enlarged view of a main part of the cam barrel in FIG. 3A.

In this case 2, when the first lens group barrel 1 receives an external force F in the optical axis direction upon the lens barrel receiving the impact of, e.g., dropping (FIG. 3), the third lens group barrel 3 receives a rotation moment F. Here, at the position P2c where the cam groove has an inclination equivalent to that in the case 1, the third lens group barrel 3 receives the rotation moment equivalent to that in the case 1, which allows the third lens group barrel 3, etc., to rotate in the rotation direction R2 (FIG. 3A).

In the case 2, the linear movement keys 3c, 3d and the projection 3e of the third lens group barrel 3 are located at positions P2f in the linear movement grooves 8c, 8d and the groove 8e, respectively (FIG. 5B). At the position P2f, the linear movement groove 8d of the fixed barrel 8 crosses the cam groove 8a. Accordingly, upon receipt of the above-mentioned large impact, the linear movement key 3d of the third lens group barrel 3 is not locked by the linear movement groove 8d of the fixed barrel 8 with respect to the rotation direction R2 of the third lens group barrel 3, because it is located at a crossing part in which the grooves cross each other.

Therefore, the lens barrel is configured so that the projection 3e of the third lens groove barrel 3 is locked by the groove 8e of the fixed barrel 8 with respect to the rotation direction R2 of the third lens group barrel 3 also at the crossing part in which the linear movement groove 8d and the cam groove 8a cross each other, which prevents the torque due to the impact from concentrating on the linear movement key 3c of the third lens group barrel 3 and the linear movement groove 8c of the fixed barrel 8.

Furthermore, a wall surface 8e1 of the groove 8e, which is configured to lock the projection 3e upon receipt of the torque in the rotation direction R2, is formed to be orthogonal to the rotation direction R2 (FIG. 6B), thereby making it difficult to unlock the projection 3e and the groove 8e from each other, which enables the torque to be effectively received.

Figure 6A:
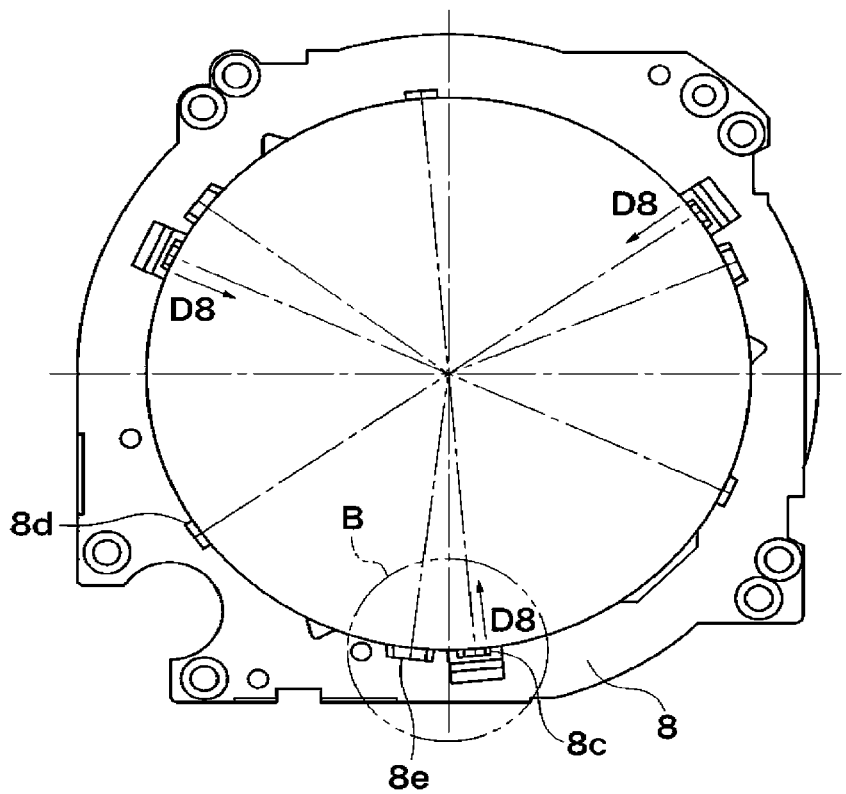
FIG. 6A is a back view of the fixed barrel in the lens barrel of FIG. 1.
Figure 6B:
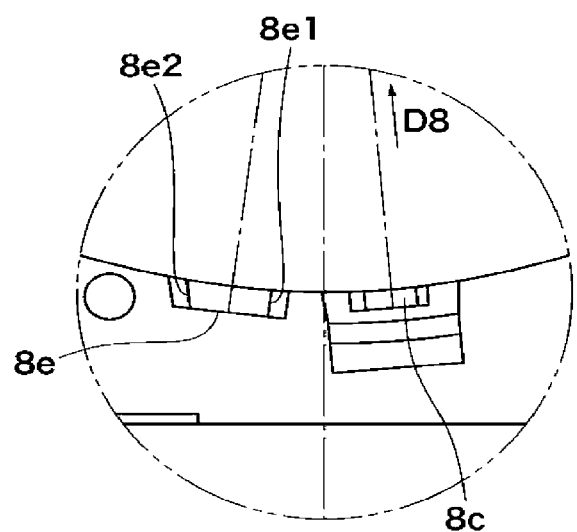
FIG. 6B is an enlarged view of a main part of the fixed barrel of FIG. 6A.

In the lens barrel, the grooves 8e are formed in the inner slide pieces D8 having formed therein the linear movement grooves 8c (FIG. 6A). A wall surface 8e1 of each of the grooves 8e is formed orthogonally to the rotation direction R2, and hence each of the grooves 8e is spaced apart from the corresponding linear movement groove 8c in the rotation direction R1 (FIG. 6B).

(Case 3) Where the cam pin 1a of the first lens group barrel 1 is located at a position P3c in the cam groove 6a of the cam barrel 6 in the shooting region (FIG. 5A).

In the case 3, when the first lens group barrel 1 receives an external force F in the optical direction upon the lens barrel receiving the impact of, e.g., being dropping (FIG. 3A), the third lens group barrel 3 receives a rotation moment F. Here, at the position 3c where the cam groove inclines in a direction opposite to that of the case 1, the third lens group barrel 3 receives the rotation moment in a direction opposite to that of the case 1, which allows the third lens group barrel 3 to rotate in the rotation direction R1.

In the case 3, the linear movement keys 3c, 3d and the projection 3e of the third lens group barrel 3 are located at positions P3f in the linear movement grooves 8c, 8d and the groove 8e (FIG. 5B). At the position P3f, the linear movement groove 8d of the fixed barrel 8 crosses the through groove 8b. Accordingly, upon receipt of the above-mentioned large impact, the linear movement key 3d of the third lens group barrel 3 is not locked by the linear movement groove 8d of the fixed barrel 8 with respect to the rotation direction R1 of the third lend group barrel 3.

Therefore, the lens barrel is configured so that the projection 3e of the third lens group barrel 3 is locked by the groove 8e of the fixed barrel 8 with respect to the rotation direction of the third lens group barrel 3 at the crossing part in which the linear movement groove 8d and the through groove 8b cross each other.

This prevents the torque due to the impact from concentrating on the linear movement key 3c of the third lens group barrel 3 and the linear movement groove 8c of the fixed barrel 8.

Furthermore, the lens barrel is configured such that, when the third lens group barrel 3 receives the torque the rotation direction R1, the projection 3e of the third lens group barrel 3 is locked by a wall surface 8e2 of the groove 8e (FIG. 6B). Thus, the wall surface 8e2 of the groove 8e is configured to be slightly less than orthogonal to the rotation direction R1, thereby making it difficult for the projection 3e to be unlocked from the groove 8e when the projection 3e abuts against the groove 8e, to thereby receive the torque.

In the lens barrel, the grooves 8e are formed using inner slide pieces D8. The wall surface 8e2 of each of the grooves 8e arranged in the vicinity of the corresponding linear movement groove 8c so as to be slightly less than orthogonal to the R1 direction (so as to reduce undercuts).

An embodiment of the present invention provides a lens barrel comprising a fixed barrel 8 having a linear movement groove 8c, a linear movement groove 8d and a groove 8e, each of which extending in an optical axis direction of the lens barrel; a cam barrel 6 having a cam groove 6c, the cam barrel 6 moving in the optical direction while rotating; and a third lens group barrel 3 having a lens therein, the third lens group barrel 3 being movable in the optical direction relative to the fixed barrel 8, and having a cam pin 3a engaging with the cam groove 6c, a linear movement key 3c engaging with the linear movement groove 8c, a linear movement key 3d engaging with the linear movement groove 8d, and a projection (3e) engaging with the groove 8e.

The lens barrel characterized in that in a movement region of the third lens group barrel 3 moving in the optical direction relative to the fixed barrel 8, each of a set of the linear movement groove 8c and the linear movement key 3c and a set of the linear movement groove 8d and the linear movement key 3d has a mutually engageable region and a mutually disengageable region, and a set of the groove 8e and the projection 3e has not a mutually engageable region.

With this arrangement, it is possible to distribute, upon receipt of the impact of, e.g., dropping, a torque so as not to concentrate on a particular linear movement key and groove for linearly moving the barrel member, thereby suppressing occurrence of a failure.

Although a preferred embodiment of the present invention has been described above, the present invention is not limited to the embodiment, and various variation and modifications are possible within the scope and sprit of the present invention.

For example, the above embodiment of the present invention has been described in terms of a lens barrel including a four-lens group optical system including the lens groups L1, L2, L3 and L4, the present invention is not limited to this type of lens barrel, and can be applied to a lens barrel including a three-lens group optical system.

Although the above embodiment of the present invention has been described in terms of the behavior of the third lens group barrel 3 upon receipt of the impact of, e.g., dropping, the present invention is not limited to this example and can be applied to another movement barrel.

Furthermore, although the above embodiment of the present invention has been described in terms of a case where the third lens group barrel 3 switches its linear movement engagement in between the retracted region and the shooting region, the present invention is not limited to this case and can be applied to a case in which the linear the movement engagement is switched within the retracted region as well as a case in which the linear movement engagement is switched within the shooting region.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2010-183293, filed Aug. 18, 2010, and Japanese Patent Application No. 2011-171031, filed Aug. 4, 2011, which are hereby incorporated by reference herein in its entirety.

What is claimed is:

1. A lens barrel, having a shooting region and a retracted region, comprising:

a linear guiding member having a first linear movement groove, a second linear movement groove, and an impact groove, each extending in an optical axis direction of the lens barrel;

a cam barrel having a cam barrel groove, said cam barrel moving in the optical direction while rotating; and a linear movement unit being movable in the optical direction relative to said linear guiding member, and having a first linear movement pin engaging the first linear movement groove, a second linear movement pin engaging the second linear movement groove, and an impact pin engaging the impact groove, wherein said linear guiding member includes a cam groove, a first crossing part at which the cam groove crosses the first linear movement groove, and a second crossing part at which the cam groove crosses the second linear movement groove, wherein, the locations of the first and second crossing parts are different from each other in the optical direction so that the first linear movement pin engages the first linear movement groove when the second linear movement pin is at the second crossing part and the second linear movement pin engages the second linear movement groove when the first linear movement pin is at the first crossing part, and wherein when the lens barrel receives an external force, the impact pin abuts against the impact groove.

2. The lens barrel according to claim 1, wherein the first crossing part is located in the retracted region.

3. The lens barrel according to claim 1, wherein the second crossing part is located in the shooting region.

4. The lens barrel according to claim 1, wherein the cam groove of the linear guiding member is a through groove.

5. An image pickup apparatus comprising:

an image sensor; and a lens barrel, having a shooting region and a retracted region, wherein the lens barrel comprises:

a linear guiding member having a first linear movement groove, a second linear movement groove, and an impact groove, each extending in an optical axis direction of the lens barrel;

a cam barrel having a cam barrel groove, said cam barrel moving in the optical direction while rotating; and a linear movement unit movable in the optical direction relative to said linear guiding member, and having a first linear movement pin engaging the first linear movement groove, a second linear movement pin engaging the second linear movement groove, and an impact pin engaging the impact groove, wherein said linear guiding member includes a cam groove, a first crossing part at which the cam groove crosses the first linear movement groove, and a second crossing part at which the cam groove crosses the second linear movement groove, wherein the locations of the first and second crossing parts are different from each other in the optical direction so that the first linear movement pin engages the first linear movement groove when the second linear movement pin is at the second crossing part and the second linear movement pin engages the second linear movement groove when the first linear movement pin is at the first crossing part, and wherein when the lens barrel receives an external force, the impact pin abuts against the impact groove.

* * * * *